(12) United States Patent
Zhu et al.

(10) Patent No.: US 12,730,695 B2
(45) Date of Patent: Sep. 8, 2026

(54) CONSUMER EFFICIENCY IN MESSAGING MIDDLEWARE SYSTEM

(71) Applicant: International Business Machines Corporation, Armonk, NY (US)

(72) Inventors: Xi Bo Zhu, Beijing (CN); Jing Yan Zhang, Beijing (CN); Wen Wen Guo, Beijing (CN); Yu Li, Beijing (CN); Ling Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 18/437,687

(22) Filed: Feb. 9, 2024

(65) Prior Publication Data

US 2025/0258728 A1 Aug. 14, 2025

(51) Int. Cl.
*G06F 9/54* (2006.01)

(52) U.S. Cl.
CPC .............. *G06F 9/546* (2013.01); *G06F 9/547* (2013.01)

(58) Field of Classification Search
None
See application file for complete search history.

(56) References Cited

U.S. PATENT DOCUMENTS 9,367,369 B2 6/2016 Chandler et al.
9,436,532 B1 * 9/2016 Chandrasekaran ..... G06F 9/546
10,230,824 B2 * 3/2019 Bergeron ................ H04L 69/22
10,599,684 B2 3/2020 Bolcer et al.
2025/0029083 A1 * 1/2025 Welch ................. G06Q 20/204

FOREIGN PATENT DOCUMENTS

CN 108769099 B 9/2021
CN 108683612 B 1/2022

OTHER PUBLICATIONS

Confluent, "Kafka Streams DSL," confluent.io, accessed Jan. 31, 2024, https://docs.confluent.io/platform/current/streams/developer-guide/dsl-api.html#streams-developer-guide-dsl-joins.

* cited by examiner

*Primary Examiner* — Bing Zhao
(74) *Attorney, Agent, or Firm* — Yee & Associates, P.C.

(57) ABSTRACT

Processing related messages in different queues in a middleware system is provided. The middleware system receives a first message that comprises a body and a header. The header includes a first message ID and a relationship key, wherein the relationship key denotes a relationship between the first message and a correlated second message. The system reads the relationship key from the header of the first message. The middleware system stores the first message in a first queue and stores the first message ID and relationship key in a relationship object in a cache list. A consumer API retrieves the first message from the first queue and extracts the relationship key from the header. The consumer API identifies, according to the relationship key, a second message ID in the relationship object and retrieves the correlated second message from a second queue according to the second message ID.

20 Claims, 9 Drawing Sheets

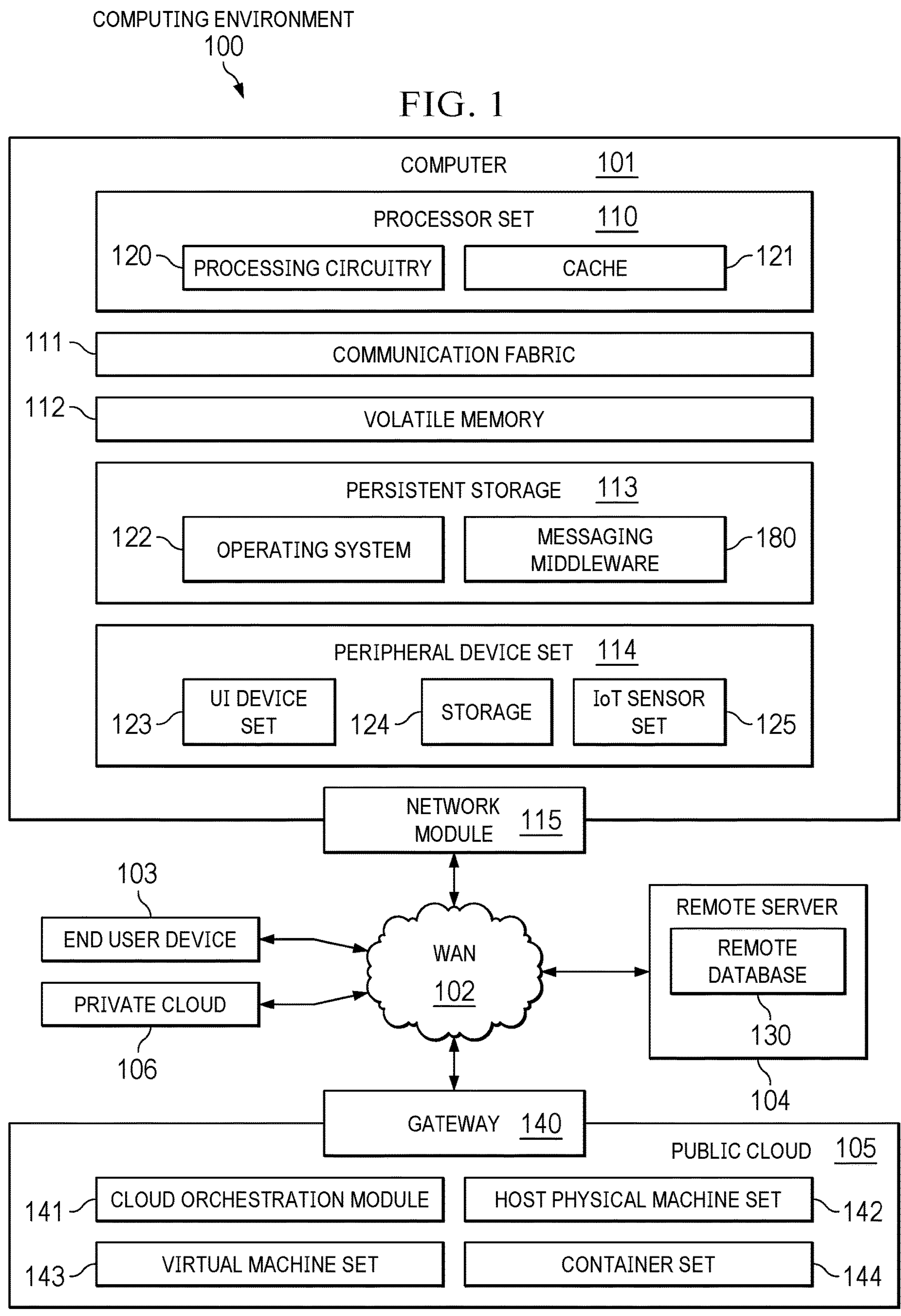
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
MESSAGING MIDDLEWARE
180
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

CONSUMER EFFICIENCY IN MESSAGING MIDDLEWARE SYSTEM

BACKGROUND

The disclosure relates generally to messaging systems and more specifically to messaging middleware systems.

Middleware is software that facilitates communication and data exchange between applications and components in a distributed computing environment. Middleware serves as an intermediary layer that enables communication between systems that might be running on different platforms, using different programming languages and communication protocols. Middleware decouples sending and receiving components, which allows them to communicate without needing to be aware of each other's existence, thereby providing flexibility and scalability.

Messages are typically sent and received through message queues provided by the middleware which act as temporary storage areas that hold the messages until they are consumed by the intended recipients. These message queues ensure that messages are not lost if the received is temporarily unavailable. In a messaging system such as Kafka, components or applications that publish (write) messages in the queues under specified topics are referred to as producers. Components or applications that subscribe to (read and process) messages in the topics are referred to as consumers.

SUMMARY

According to an illustrative embodiment, a computer-implemented method for processing related messages in different queues in a middleware system. The method comprises receiving, by the middleware system, a first message, wherein the first message comprises a body and a header, wherein the header includes a first message ID and a relationship key, wherein the relationship key denotes a relationship between the first message and a correlated second message. The middleware system reads the relationship key from the header of the first message. The middleware system stores the first message in a first queue. The middleware system also stores the first message ID and the relationship key in a relationship object in a cache list. A consumer application programming interface (API) retrieves the first message from the first queue and extracts the relationship key from the header of the first message. The consumer API identifies, according to the relationship key, a second message ID in the relationship object in the cache list and retrieves the correlated second message from a second queue according to the second message ID. According to other illustrative embodiments, a computer system and a computer program product for processing related messages in different queues in a middleware system are provided.

BRIEF DESCRIPTION OF THE DRAWINGS

FIG. 1 is a block diagram of a computing environment in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
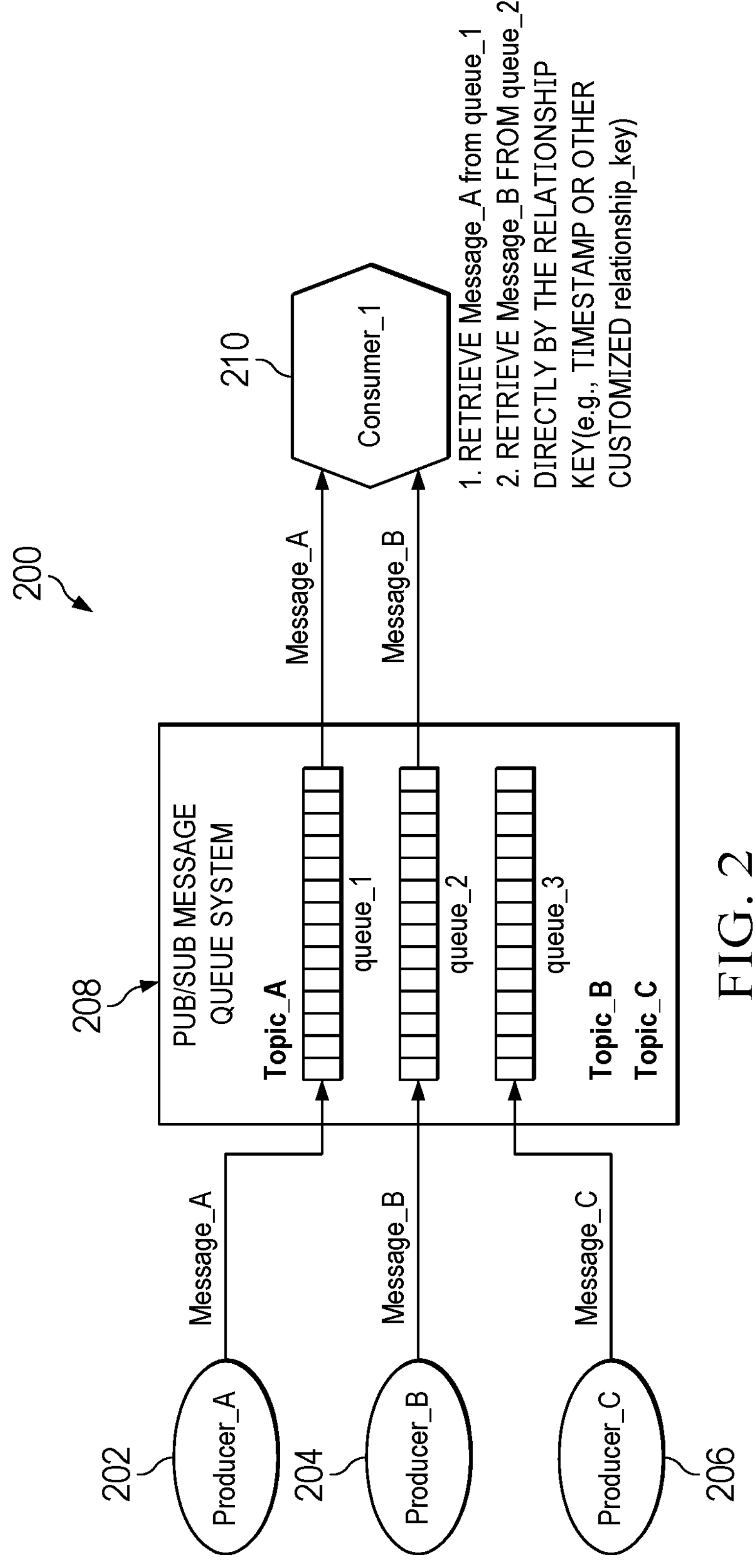
FIG. 2 illustrates an example of message publication and retrieval in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as messaging middleware 180. In this example, messaging middleware 180 can operate to manage access for computing environments.

In addition to messaging middleware 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and messaging middleware 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in messaging middleware 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in messaging middleware 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that, in message middleware systems, the producer side publishes messages in different queues to keep the system scalable. To take a typical example of Kafka, different types of messages are published to different partitions in different topics. Those messages in different queues are usually independent of each other. In general, the data the consumer requires is all in one queue.

The illustrative embodiments also recognize and take into account that as business requirements change, consumers may need to read data from two or more queues. Based on this change, it may be necessary to perform some extra operations on the data when reading them from different queues to support their business needs.

For example, the consumer must find message A from queue_1 and find message B which has a time-sequential relationship with message A from queue_2. Then the consumer should get message A from queue_1 from back to front first, and then get message B from queue_2 from back to front as well. The time complexity for this process is high. (Regarding O(n), n is the length of the queue. The larger n is, the greater the effect is on time).

As another example, the consumer must find message A from queue_1 and find message B from queue_2 which has another type of relationship with message A (e.g., they have a common key). Then the consumer should get the data from Messaging Middleware System and ingest the data to RDBMS (Relational Database Management software, e.g., SQL Server, Oracle etc.), and using the joint function of the RDBMS to complete its own business logic. But this process will be a waste of space for the consumer. If all joint operations are left to the consumer, it will have a negative impact on the efficiency of the consumer.

The illustrative embodiments provide a solution in which the messaging middleware system stores both messages and the message relationships to provide the ability to quickly find related messages across message queues. When the consumer needs to find related messages stored in queue_1 and queue_2, it can be quickly find them through the specific relationship. In this way, the illustrative embodiments help the consumer avoid the extra operations, thereby saving space or time for the consumer and improving consumer efficiency.

The illustrative embodiments provide a new data structure that can store message relationships. A pre-process method decides how to store data to the Data Store Component and data relationship to the Relationship Store Component. A new application programming interface (API) allows consumers to quickly find related messages across message queues.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

FIG. 2 illustrates an example of message publication and retrieval in accordance with an illustrative embodiment. In this example Producer_A 202 publishes Message_A to queue_1 under Topic_A in message queue system 208. Similarly, Producer_B 204 publishes Message_B to queue_2 also under Topic_A, and Producer_C 206 publishes Message_C to queue_3 under Topic_A in message queue system 208.

When Consumer_1 210 needs to retrieve both Message_A and Message_B, which are stored in different respective queues, it first retrieves Message_A from queue_1. By using a relationship key that connects Message_A and Message_B (e.g., time stamp or customized relationship key), consumer_1 210 is then able to directly retrieve Message_B from queue_2 according to the relationship between the messages without having to perform a brute force search.

Figure 3:
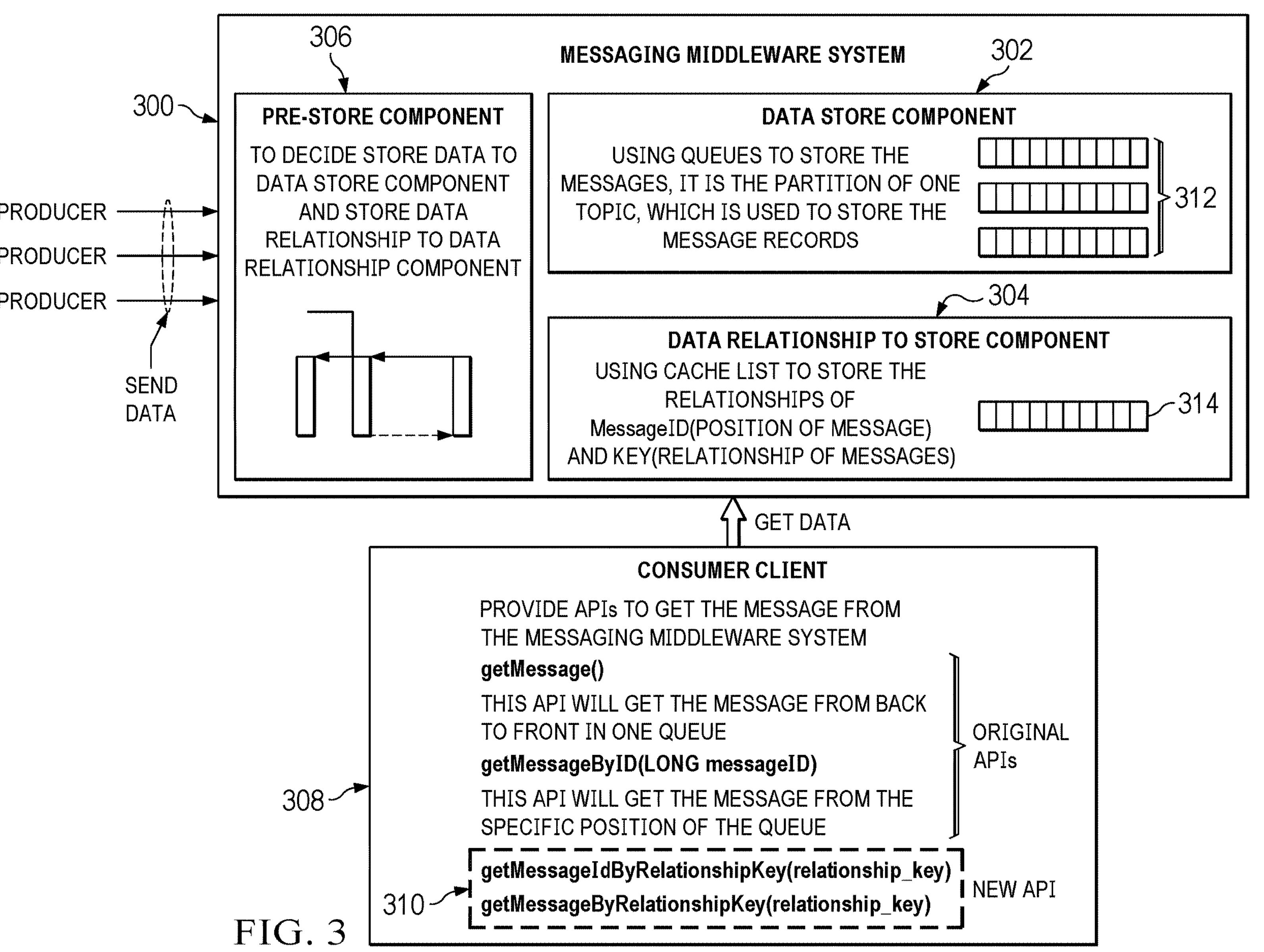
FIG. 3 is a diagram illustrating an architecture of a middleware system in accordance with an illustrative embodiment.

FIG. 3 is a diagram illustrating an architecture of a middleware system in accordance with an illustrative embodiment. In the example embodiment, the message middleware system 300 comprises data store component 302, which is an example of message queue system 208 in FIG. 2. Data store component 302 uses queues 312 to store messages published by producers. Data store component 302 is the partition of one topic which is used to store the message records.

The illustrative embodiments add a data relationship store component 304 to messaging middleware system 300. This data relationship store component 304 uses a cache list 314 to store the relationships of messageID (position of a message store in queues 312) and a relationship key denoting the relationship of messages in different queues.

The illustrative embodiments also add a pre-store component 306 to messaging middleware system 300. This pre-store component 306 decides how to store data to the data store component 302 and how to store the relationship of messages to the data relationship store component 304.

Consumer client 308 might be a component or application in a distributed computing system that retrieves data from the messaging middleware system 300. Consumer client 308 typically has a number of APIs that retrieve messages from the messaging middleware system 300. The illustrative embodiments introduce a new message-locating API for the consumer client 308 that locates messages in different queues according to a relationship in data relationship store component 304.

Figure 4:
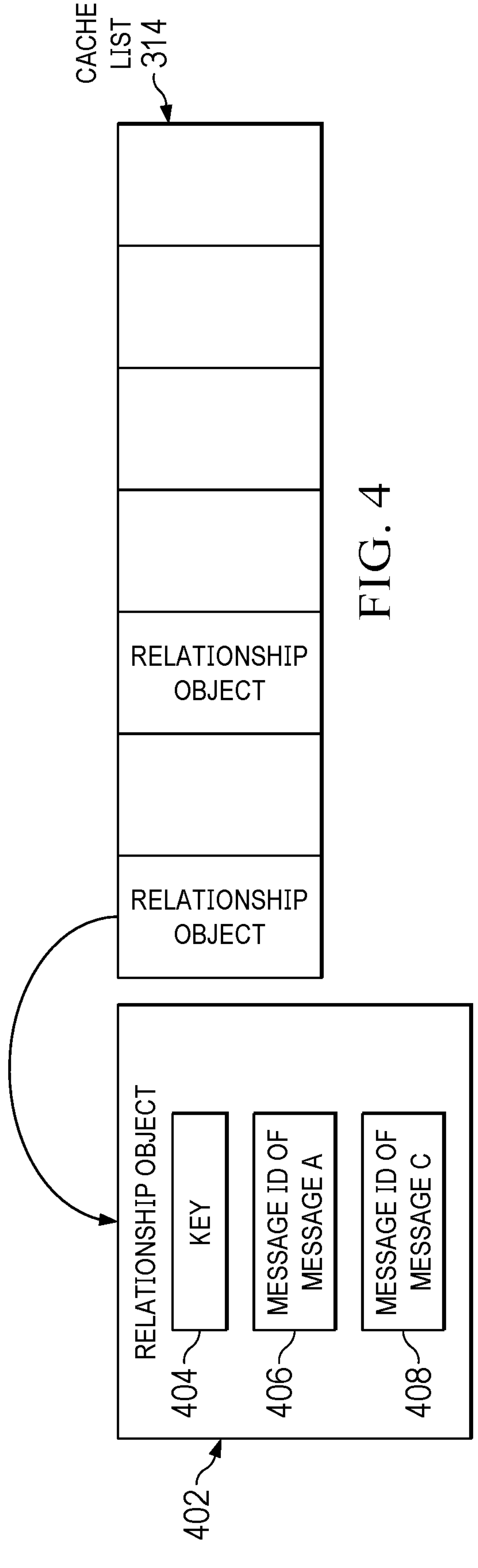
FIG. 4 illustrates a cache list in the data relationship store component in accordance with an illustrative embodiment.

FIG. 4 illustrates a cache list 314 in data relationship store component 304 in accordance with an illustrative embodiment. Cache list 314 stores a number of relationship objects corresponding to messages in the data store component 302 of middleware messaging system 300. Each relationship object 402 contains information about the relationship of messages in different queues. The relationship object 402 comprises a relationship key 404, the message ID 406 of a first message in one queue, and the message ID 408 of a second message in another queue. The message IDs 406, 408 specify the respective positions of the messages in their queues.

The relationship key 404 may take different forms. If the consumer needs to retrieve messages that have a time sequential relationship, the relationship key will take the form of a timestamp. If messages have another type of relationship (e.g., a common key), the relationship key may take the form of a customized field. Examples of other types of relationships between messages includes, without limitation, having the same host, task-number, address, correlation ID, group, classification, job ID, device ID, or any shared property in the header of both messages.

Figure 5:
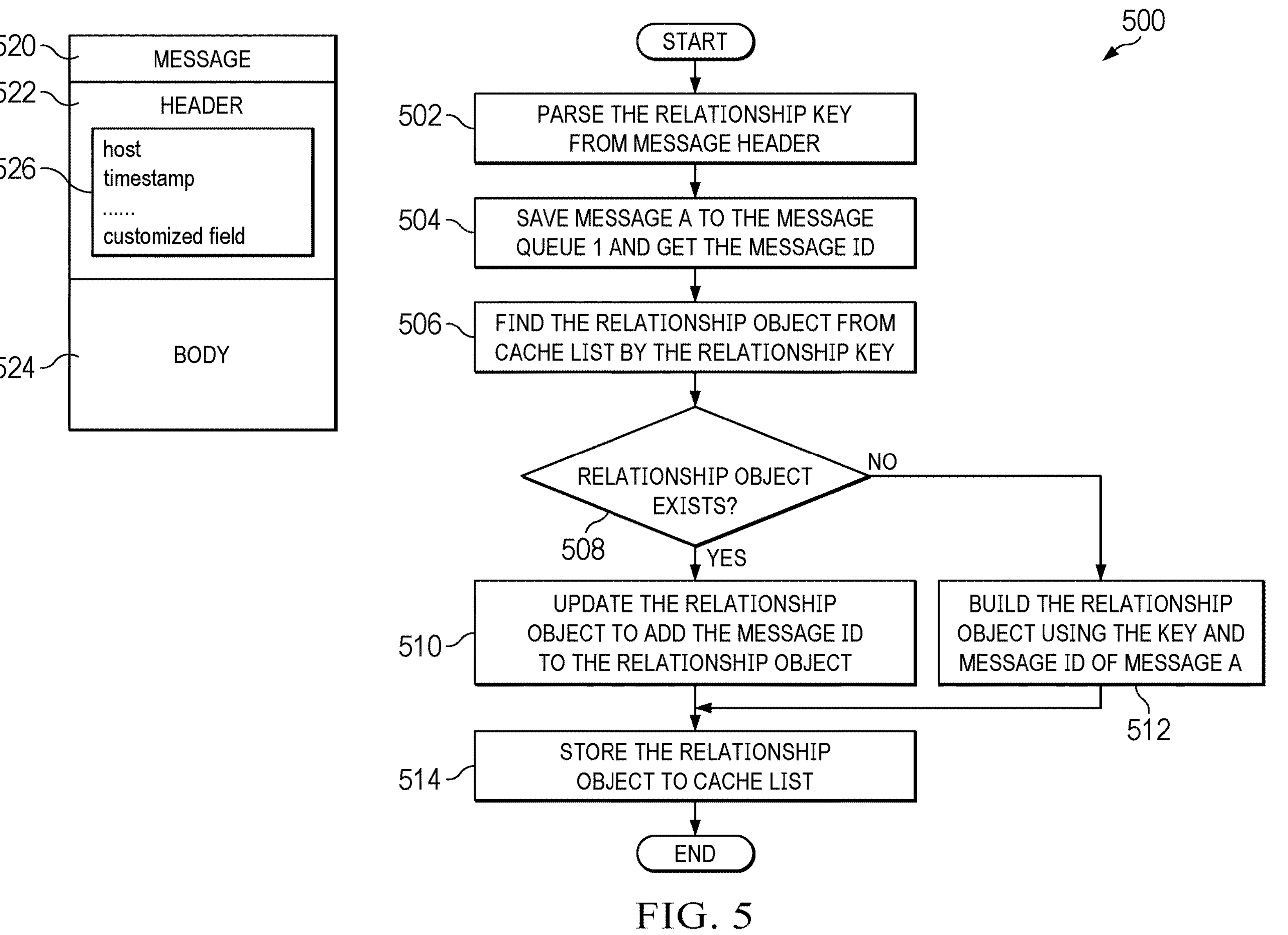
FIG. 5 depicts a flowchart illustrating the operation of the pre-store component in accordance with an illustrative embodiment.

FIG. 5 depicts a flowchart illustrating the operation of the pre-store component 306 in accordance with an illustrative embodiment. Also depicted in FIG. 5 is an example message which is analyzed by the pre-store component.

Every message 520 has a message header 522 and a message body 524. The message header 522 includes a relationship key 526, which might be a timestamp or customized field as explained above. The relationship key 526 is placed in the message header 522 so as not to affect the message body 524.

When a message is published to the middleware messaging system, process 500 in the pre-store component begins by parsing the relationship key 526 from the message header 522 (step 502). The pre-store component saves the message to a queue and retrieves the message ID of the message (step 504).

The pre-store component then attempts to find the relationship object from the cache list according to the relationship key (step 506) and determines whether such a relationship object exists in the cache list (step 508). If the relationship object does exist, the pre-store component updated the relationship object to add the message ID of the newly stored message (step 510). If the relationship object does not exist, the pre-store component builds the relationship object using the relationship key and message ID of the newly stored message (step 512).

The pre-store component then stores the new relationship object (or updates to an existing relationship object) in the cache list (step 514). Process 500 then ends.

Figure 6:
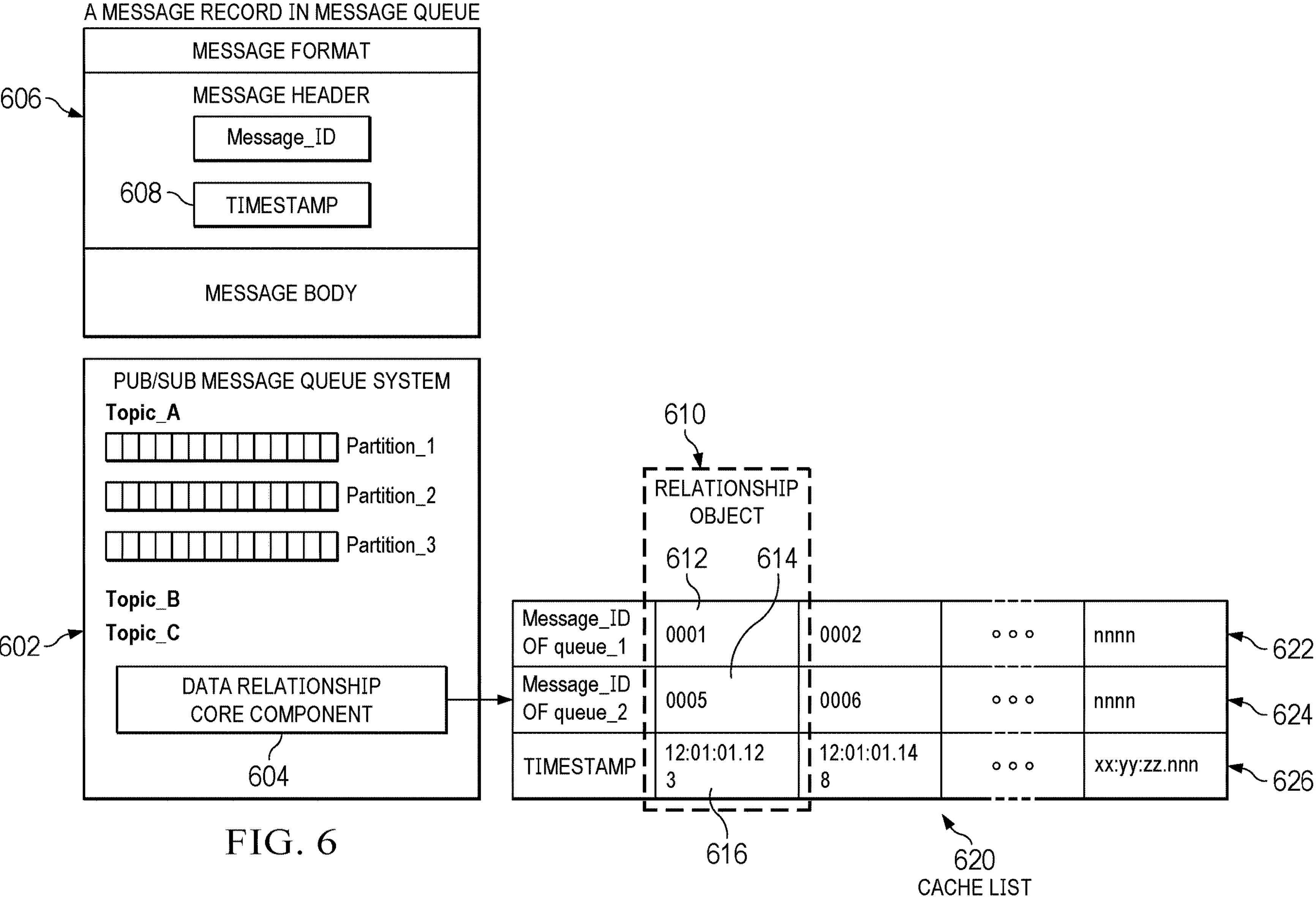
FIG. 6 illustrates the operation of a data relationship store component in accordance with an illustrative embodiment.

FIG. 6 illustrates the operation of a data relationship store component in accordance with an illustrative embodiment. As explained above the messaging middleware system stores both data and the relationships between the data.

Message data is stored in respective queues in a message Queue system 602, and the relationships between data of messages in different queues is stored in data relationship component 604. In the present example, message 606 has a relationship key in the form of a timestamp 608.

In the present example, cache list 620 contained in data relationship components 604 includes a first row 622 that stores message IDs for queue_1 in message queue system 602 and a second row 624 that stores message IDs for queue_2 in message queue system 602. Cache list 620 also has row 626 containing respective timestamps of the messages.

Relationship object 610 comprises a column down rows 622, 624, and 626. In the present example relationship object 610 includes a first message ID 612 denoting the position of a message in queue_1 and message ID 614 denoting the position of another message in queue_2. The two messages in relationship object 610 are related to each other by timestamp 616.

How related messages are located in different message queues depends on the nature of their relationship. When the messages are time sequenced (i.e., the relationship key is a timestamp), Message B will be after the time of message A. This relationship is not characterized by exact equality but rather a sequential relationship. Therefore, message A will not lead directly to Message B in queue 2 but will narrow the scope of the search.

Figure 7:
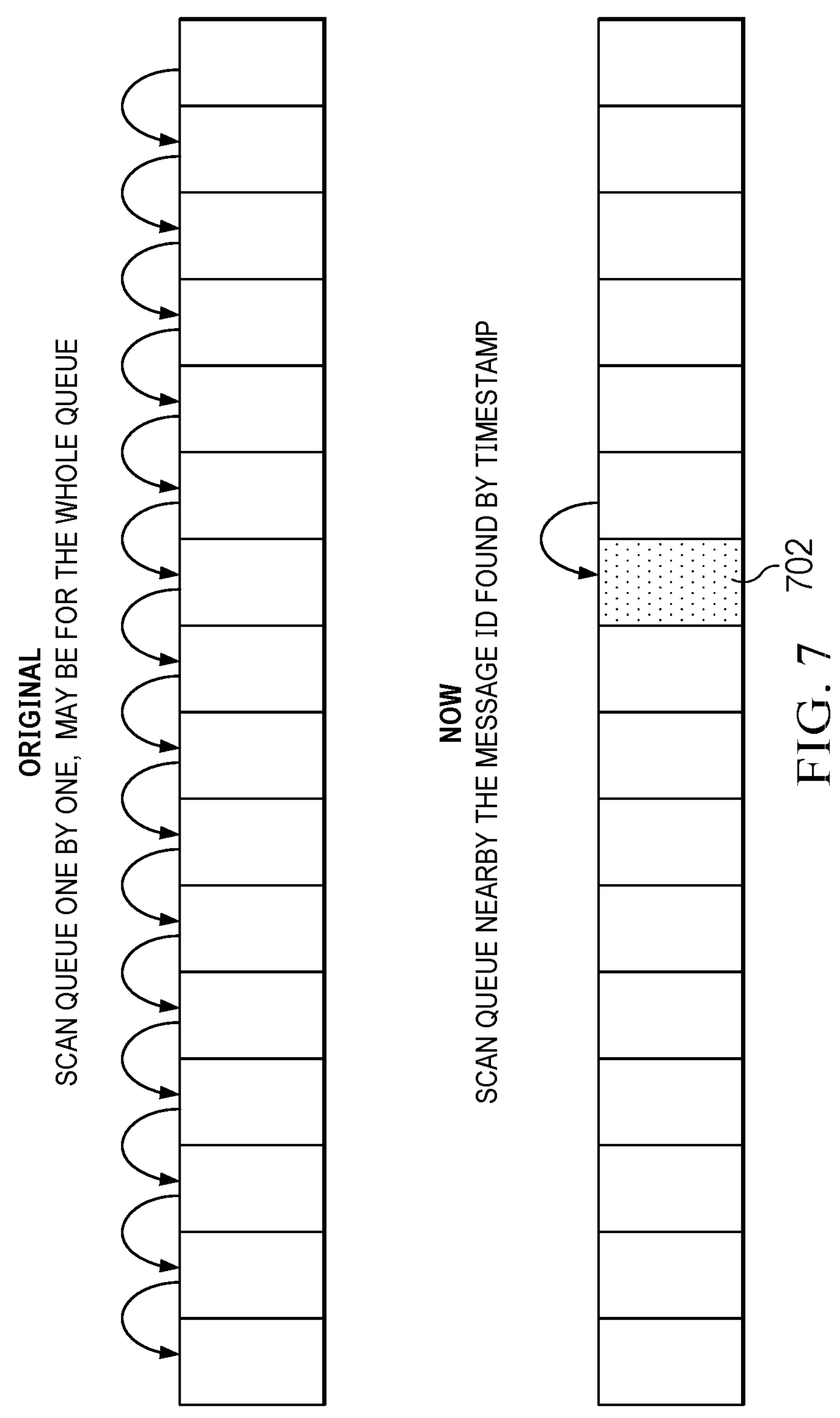
FIG. 7 illustrates the operation of a consumer message-locating API for finding related messages related according to timestamp in accordance with an illustrative embodiment.

FIG. 7 illustrates the operation of a consumer message-locating API for finding related messages related according to timestamp in accordance with an illustrative embodiment. The consumer message-locating API first retrieves Message A from queue 1 in the messaging middleware system and extracts the timestamp of Message A from the message header.

Using the timestamp extracted from the header of Message A, the consumer message-locating API checks the cache list in the data relationship store component and finds in the relationship object a message ID 702 in queue 2 that has the same timestamp as Message A. Instead of scanning through the whole of queue 2 one message ID at a time to find the correlated Message B, as is done with current methods, the consumer message-locating API begins its scan of queue 2 from message ID 702 which has the same timestamp as Message A. If Message B sequentially comes after Message A, the consumer message-locating API scans backwards from message ID 702 to find correlated Message B. As a result, the scan logic of the consumer message-locating API is able to bypass non-relevant messages.

In contrast to a timestamp, when both messages have the same relationship key (i.e., same host, task-number, address, correlation key, etc.), the relationship is characterized by the fact that the two values are equal, i.e., messageA.host=messageB.host. Therefore, when the consumer finds Message A in queue 1, it can directly find Message B in queue 2.

Figure 8:
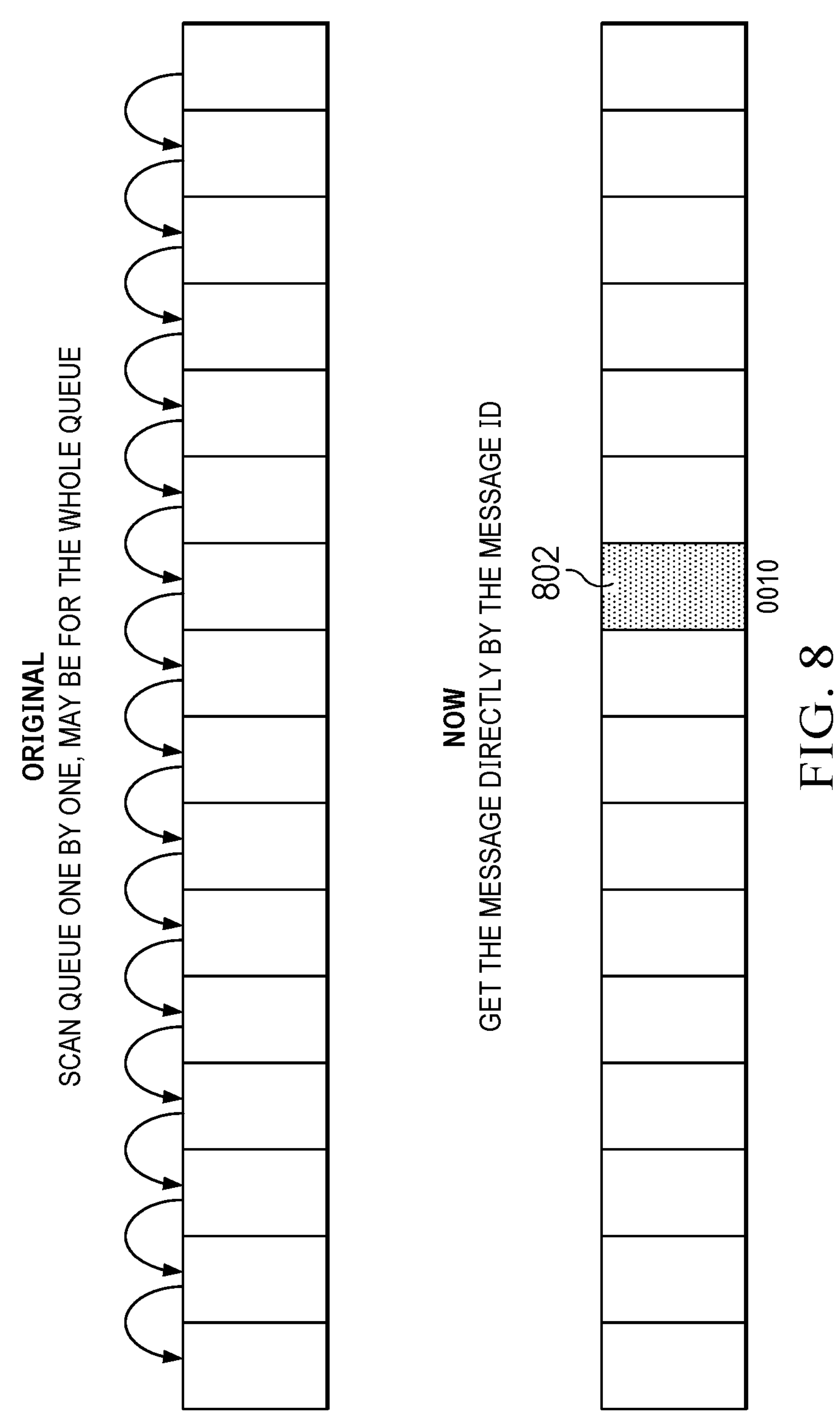
FIG. 8 illustrates the operation of a consumer message-locating API for finding related messages related according to customized relationship in accordance with an illustrative embodiment.

FIG. 8 illustrates the operation of a consumer message-locating API for finding related messages related according to customized relationship in accordance with an illustrative embodiment. The consumer message-locating API first retrieves Message A from queue 1 in the messaging middleware system and extracts the customized relationship key of Message A from the message header.

Using the customized relationship key extracted from the header of Message A, the consumer message-locating API checks the cache list in the data relationship store component and gets the message ID of Message B in queue 2. Instead of scanning through the whole of queue 2 one message ID at a time to find the correlated message as is done with current methods, the consumer message-locating API is able to save the scan operation and go directly to the position 802 in queue 2 according to the message ID of correlated Message B found in the cache list.

Figure 9:
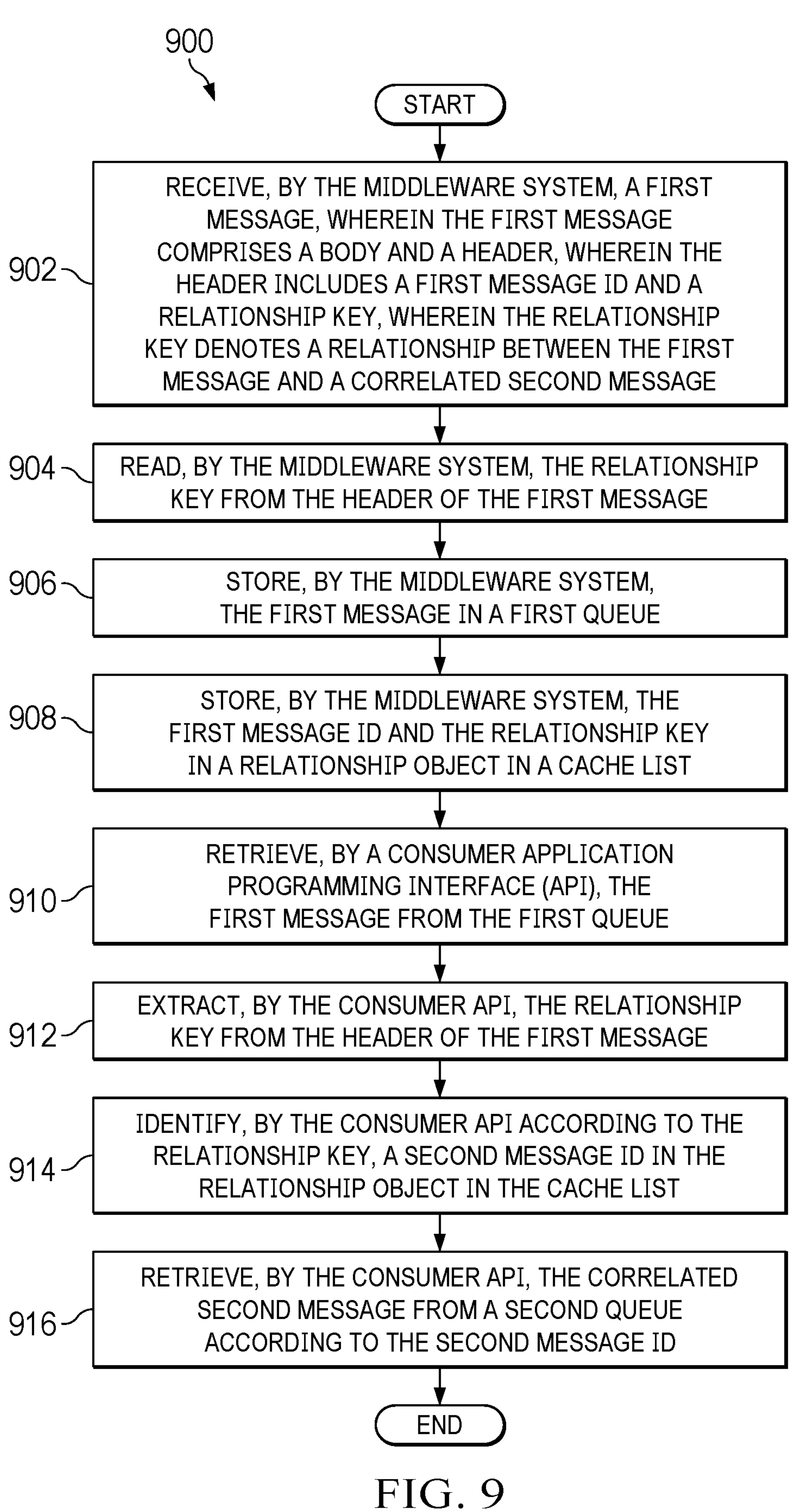
FIG. 9 depicts a flowchart illustrating a process for processing related messages in different queues in a middleware system.

FIG. 9 depicts a flowchart illustrating a process for processing related messages in different queues in a middleware system. Process 900 can be implemented in messaging middle 180 in FIG. 1 and messaging middleware system 300 in FIG. 3.

Process 900 begins by receiving, by the middleware system, a first message, wherein the first message comprises a body and a header, wherein the header includes a first message ID and a relationship key, wherein the relationship key denotes a relationship between the first message and a correlated second message (step 902).

The middleware system reads the relationship key from the header of the first message (step 904). The relationship key might comprise a timestamp. Alternatively, the relationship key might comprise a customized field denoting an equal value between the first message and correlated second message. The equal value might comprise one of host, task-number, address, correlation ID, group, classification, job ID, device ID, or any shared property in the header of both messages.

The middleware system stores the first message in a first queue (step 906). The middleware system also stores the first message ID and the relationship key in a relationship object in a cache list (step 908).

A consumer application programming interface (API) retrieves the first message from the first queue (step 910) and extracts the relationship key from the header of the first message (step 912). The consumer API identifies, according to the relationship key, a second message ID in the relationship object in the cache list (step 914).

The consumer API then retrieves the correlated second message from a second queue according to the second message ID (step 916). If the relationship key is a timestamp, the consumer API finds the correlated second message by scanning the second queue starting from the second message ID. In this case, the second message ID is for a third message in the second queue that has the same timestamp as the first message. If the relationship key is a customized field, the consumer API retrieves the second message directly according to the second message ID in the relationship object. The first message ID and second message ID specify respective positions in the first and second queues. Process 900 then ends.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms “includes”, “including”, “has”, “contains”, and variants thereof are used herein, such terms are intended to be inclusive in a manner similar to the term “comprises” as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of processing related messages in different queues in a middleware system, the method comprising:

receiving, by the middleware system, a first message, wherein the first message comprises a body and a header, wherein the header includes a first message ID and a relationship key, wherein the relationship key denotes a relationship between the first message and a correlated second message;

reading, by the middleware system, the relationship key from the header of the first message;

storing, by the middleware system, the first message in a first queue;

storing, by the middleware system, the first message ID and the relationship key in a relationship object in a cache list;

retrieving, by a consumer application programming interface (API), the first message from the first queue;

extracting, by the consumer API, the relationship key from the header of the first message;

identifying, by the consumer API according to the relationship key, a second message ID in the relationship object in the cache list; and retrieving, by the consumer API, the correlated second message from a second queue according to the second message ID.

2. The method of claim 1, wherein the relationship key comprises a timestamp.

3. The method of claim 2, wherein the consumer API finds the correlated second message by scanning the second queue starting from the second message ID, wherein the second message ID is for a third message in the second queue that has the same timestamp as the first message.

4. The method of claim 1, wherein the relationship key comprises a customized field denoting an equal value between the first message and correlated second message.

5. The method of claim 4, wherein the equal value comprises one of:

host;

task-number;

address;

correlation ID;

group;

classification;

job ID; or device ID.

6. The method of claim 4, wherein the consumer API retrieves the second message directly according to the second message ID in the relationship object.

7. The method of claim 1, wherein the first message ID and second message ID specify respective positions in the first and second queues.

8. A system for processing related messages in different queues in a middleware system, the system comprising:

a storage device that stores program instructions;

one or more processors operably connected to the storage device and configured to execute the program instructions to cause the system to:

receive, by the middleware system, a first message, wherein the first message comprises a body and a header, wherein the header includes a first message ID and a relationship key, wherein the relationship key denotes a relationship between the first message and a correlated second message;

read, by the middleware system, the relationship key from the header of the first message;

store, by the middleware system, the first message in a first queue;

store, by the middleware system, the first message ID and the relationship key in a relationship object in a cache list;

retrieve, by a consumer application programming interface (API), the first message from the first queue;

extract, by the consumer API, the relationship key from the header of the first message;

identify, by the consumer API according to the relationship key, a second message ID in the relationship object in the cache list; and retrieve, by the consumer API, the correlated second message from a second queue according to the second message ID.

9. The system of claim 8, wherein the relationship key comprises a timestamp.

10. The system of claim 9, wherein the consumer API finds the correlated second message by scanning the second queue starting from the second message ID, wherein the second message ID is for a third message in the second queue that has the same timestamp as the first message.

11. The system of claim 8, wherein the relationship key comprises a customized field denoting an equal value between the first message and correlated second message.

12. The system of claim 11, wherein the equal value comprises one of:

host;
task-number;
address;
correlation ID;
group;
classification;
job ID; or
device ID.

13. The system of claim 11, wherein the consumer API retrieves the second message directly according to the second message ID in the relationship object.

14. The system of claim 9, wherein the first message ID and second message ID specify respective positions in the first and second queues.

15. A computer program product for processing related messages in different queues in a middleware system, the computer program product comprising:

a persistent storage medium having program instructions configured to cause one or more processors to:

receive, by the middleware system, a first message, wherein the first message comprises a body and a header, wherein the header includes a first message ID and a relationship key, wherein the relationship key denotes a relationship between the first message and a correlated second message;

read, by the middleware system, the relationship key from the header of the first message;

store, by the middleware system, the first message in a first queue;

store, by the middleware system, the first message ID and the relationship key in a relationship object in a cache list;

retrieve, by a consumer application programming interface (API), the first message from the first queue;

extract, by the consumer API, the relationship key from the header of the first message;

identify, by the consumer API according to the relationship key, a second message ID in the relationship object in the cache list; and retrieve, by the consumer API, the correlated second message from a second queue according to the second message ID.

16. The computer program product of claim 15, wherein the relationship key comprises a timestamp.

17. The computer program product of claim 16, wherein the consumer API finds the correlated second message by scanning the second queue starting from the second message ID, wherein the second message ID is for a third message in the second queue that has the same timestamp as the first message.

18. The computer program product of claim 15, wherein the relationship key comprises a customized field denoting an equal value between the first message and correlated second message.

19. The computer program product of claim 18, wherein the equal value comprises one of:

host;
task-number;
address;
correlation ID;
group;
classification;
job ID; or
device ID.

20. The computer program product of claim 18, wherein the consumer API retrieves the second message directly according to the second message ID in the relationship object.

* * * * *